Feb. 1, 1966    G. C. MAYER ETAL    3,232,365
MULTI-RANGE WEIGHING APPARATUS AND METHOD
Filed April 1, 1963    4 Sheets-Sheet 1

INVENTORS
ARTHUR J. BURKE
and
GERALD C. MAYER
BY  Norris & Bateman
ATTORNEYS

Feb. 1, 1966   G. C. MAYER ETAL   3,232,365
MULTI-RANGE WEIGHING APPARATUS AND METHOD
Filed April 1, 1963   4 Sheets-Sheet 2

INVENTORS
ARTHUR J. BURKE
and
GERALD C. MAYER
BY *Norris & Bateman*
ATTORNEYS

INVENTORS
ARTHUR J. BURKE
and
GERALD C. MAYER
BY
Norris & Bateman
ATTORNEYS

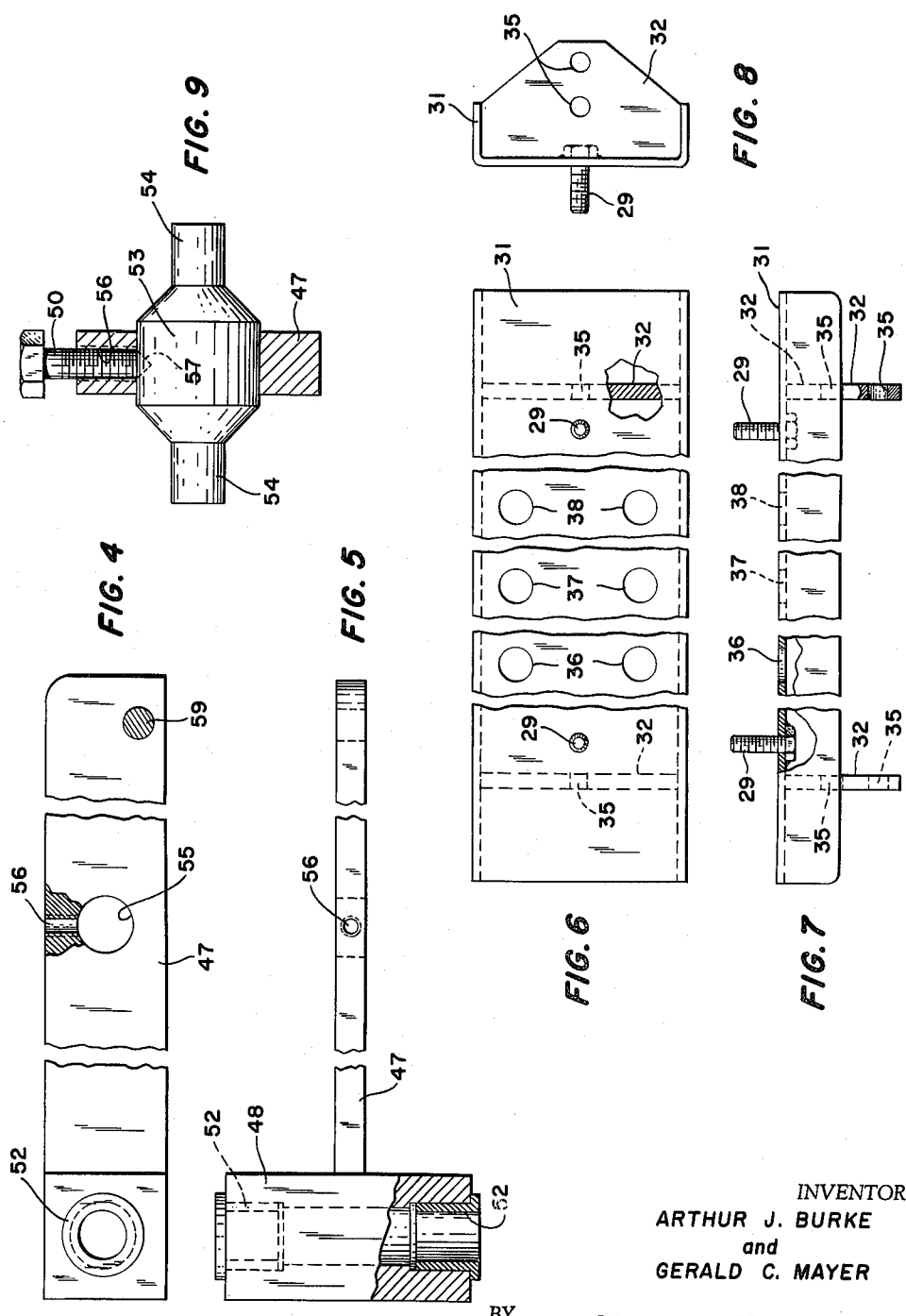

United States Patent Office 3,232,365
Patented Feb. 1, 1966

3,232,365
MULTI-RANGE WEIGHING APPARATUS
AND METHOD
Gerald C. Mayer, Wayne, and Arthur J. Burke, Oakland,
N.J., assignors to Howe Richardson Scale Company,
Clifton, N.J., a corporation of Delaware
Filed Apr. 1, 1963, Ser. No. 269,243
18 Claims. (Cl. 177—248)

This invention relates to multi-range weighing apparatus and method and particularly to such apparatus and method wherein the main weigh beam structure is maintained within substantially the same condition of total strain due to loading regardless of the selected weigh range. In carrying out the invention special arrangements are provided for associating different range weights with the main beam for changing the capacity of the apparatus while maintaining strain relationships on the weigh beam in the different ranges.

In a multi-range weighing apparatus the scale pointer or like indicator has the same angular movement over the same scale region in the various weight ranges. A chief advantage of this is that a scale dial having a smaller reading range of relatively large graduations may be used.

It has been customary in batch weighing apparatus to provide for weighing operations in different scale ranges by the use of so-called drop weights which are selectively placed on the weigh beam in counterbalancing relation to the load to be weighed.

For example if a weighing apparatus without drop weights is adapted for weighing in the scale range of 0–20 pounds, it is converted to a 20–40 pound range by suitably placing an effective 20 pound weight on the beam in counter weight relation to the load. This means that the scale pointer remains at scale zero until 20 pounds of load has accumulated and then traverses the scale during the next 20 pounds of accumulating load. It is customary under these conditions to either add 20 pounds to the actual scale reading, or provide a coextensive second scale marking in the 20–40 pound range.

If the desired load is between 40 and 60 pounds, an effective total counterbalance of 40 pounds is placed on the beam, and there is no movement of the scale pointer until forty pounds has accumulated in the load hopper. Here forty pounds is added to the actual scale reading, or a third coextensive scale marking in the 40–60 pound range is provided.

While the foregoing is workable in theory and is presently used in practice as the best available we have discovered that, particularly in batch weighing where relatively heavy and widely different weight loads are encountered, such accumulation of the drop weights in counterbalance produces such differing total strain on the weigh beam during various weight ranges that differences in accuracy are encountered between the several ranges. For example, in a batch weigher wherein 20 pounds of a first ingredient A and 40 pounds of a second ingredient B are to be introduced in succession into the same load hopper, the scale beam is subject to considerably higher bending strain after the introduction of ingredient B. During the introduction of ingredient A the beam is stressed in bending essentially only by the 20 pound accumulation effective on only the loading side, whereas during introduction of ingredient B the beam is stressed in bending by a load of 40 pounds on the counterbalance side and up to 60 pounds on the loading side. The much higher strain effective in the upper weight range so modifies performance of the beam in the weighing apparatus as to produce a lack of accuracy in the overall weighing.

In the present invention the main weigh beam structure is maintained under essentially the same total load strain conditions regardless of the weight range selected by the range weights. In accomplishing this I locate the range weights on the loading side of the fulcrum and successively substitute accumulated load for the range weights during the successive weight ranges.

With the foregoing in view it is the major object of this invention to provide a novel multi-range weighing apparatus and method wherein the weigh beam structure is subjected to substantially the same total load strain condition during all the weigh ranges.

A further object of the invention is to provide a novel multi-range weighing apparatus wherein different weight ranges indicative on the same scale region may be selected by selectively changing applied weights on the loading side of a suitably counterweighted main beam structure.

It is a further object of the invention to provide a novel multi-range weighing apparatus wherein the main scale beam is counterweighted to a total corresponding to the highest weigh range, and a plurality of different weights are removably mounted on the loading side of the beam.

Another object of the invention is to provide a novel weighing apparatus wherein a counterweighted main beam structure is pivoted on a frame and is adapted to carry one or more weights, together with special means for independently lifting and lowering said weights relative to said weigh beam structure.

Another object of the invention is to provide a novel power cylinder and lever arrangement for lifting one or more weights from a weigh beam structure and maintaining the weights remote from the beam.

It is a further object of the invention to provide a novel weighing apparatus wherein a main beam is counter weighted at one side of a fulcrum and provided at the loading side with a support for a plurality of different weights and pivoted levers with lost motion connections to the respective weights may be selectively mounted to lift weights off said support.

It is a further object of the invention to provide a novel method of batch weighing wherein a main scale beam structure provided with a fixed counterweight at one side of the fulcrum has predetermined weights selectively removed from the loading side thereof as the scale is adapted to different weigh capacities.

A further object of the invention is to provide a novel method of weighing wherein range weights are selectively removed to enable accumulated load weight on the weigh beam to be substituted therefor to enable use of the same scale region for successive weight ranges.

Further objects of the invention will appear as the description proceeds in connection with the appended claims and the annexed drawings wherein:

FIGURE 4 is a side elevation of a range weight lever;

FIGURE 5 is a top plan view of a range weight lever;

FIGURE 6 is a top plan view of the drop weight plate;

FIGURE 7 is a side elevation of the drop weight plate of FIGURE 6;

FIGURE 8 is an end elevation of the drop weight plate of FIGURE 7; and

FIGURE 9 is an enlarged fragmentary section showing the hanging mounting of the drop weight on the lever.

Figure 3:
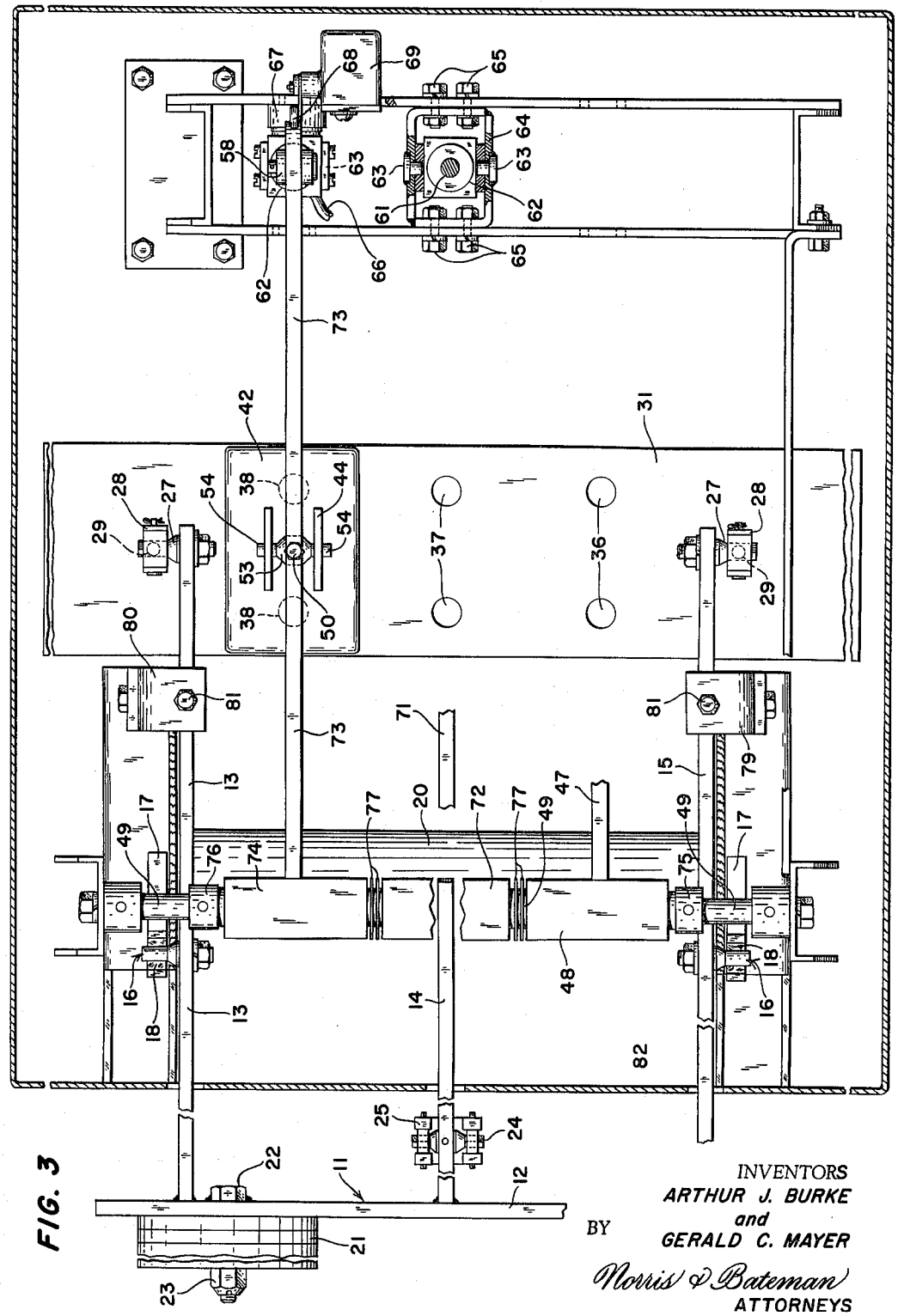
FIGURE 3 is a top plan view of the apparatus of FIGURES 1 and 2 showing particularly the relationship of the main scale beam to the range weight levers.

The apparatus according to a preferred mode of practicing the invention comprises a main weigh beam 11 that extends generally horizontally and comprises a transverse bar 12 and three equally spaced longitudinal bars 13, 14 and 15 (FIGURE 3).

Figure 1:
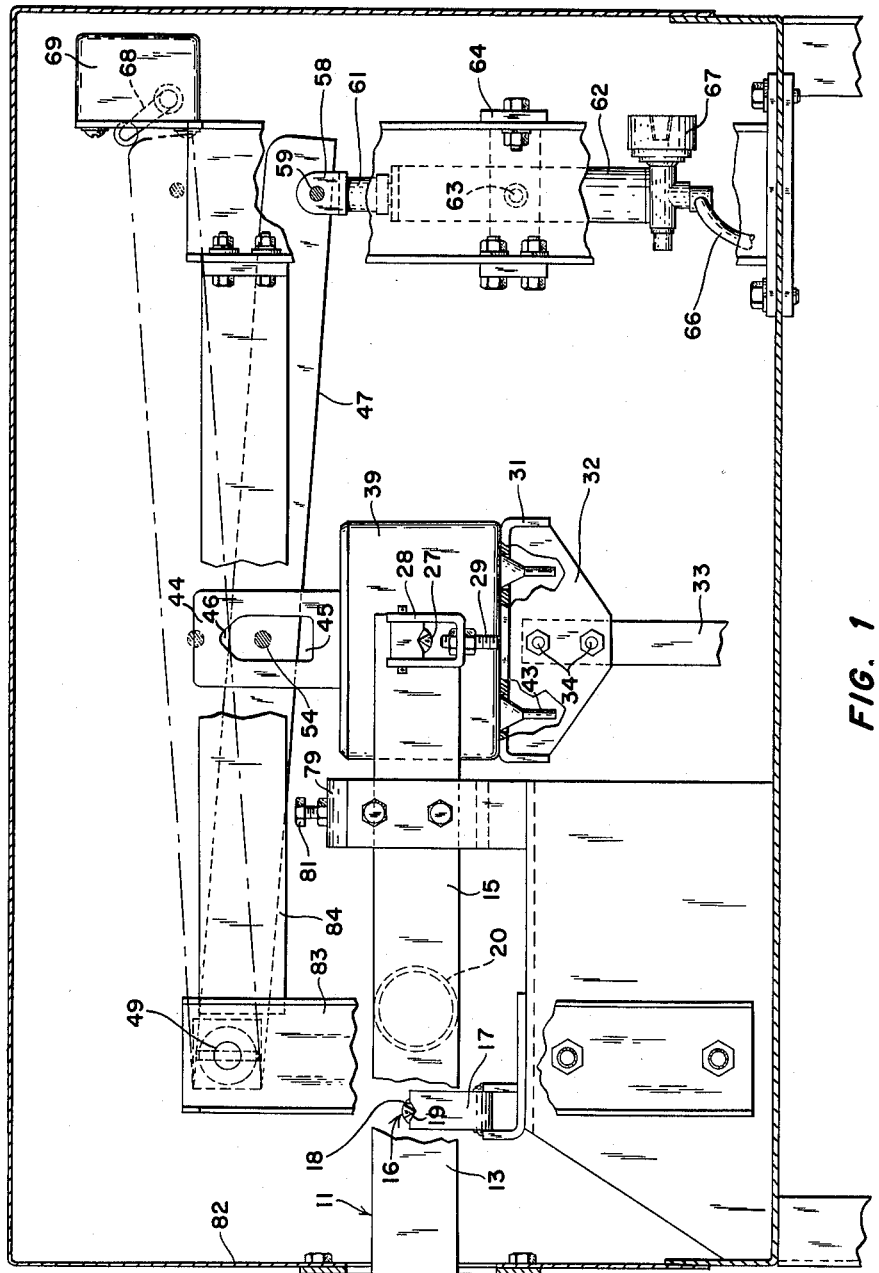
FIGURE 1 is a side elevation showing apparatus according to a preferred embodiment of the invention and particularly showing the counterweighted main scale beam and the arrangement for applying range weights on the main scale beam.

Beam 11 is pivotally mounted upon laterally aligned knife edge assemblies 16 of conventional design at stationary frame supports 17. As shown in FIGURE 1 the supports 17 have V-grooves 18 rockably receiving knife edge elements 19 fixed to beam arms 13 and 15. A rigid transverse main beam member 20 is centrally welded to the end of bar 14 and is rigidly connected at its ends to bars 13 and 15.

At its left end in FIGURE 3, beam 11 carries two sets of counterweights 21. These counterweights are fixedly secured to bar 12 by studs 22 and nuts 23, the latter being removable to change the counterweights if desired. One set of counterweights is shown near the juncture of bars 12 and 13 in FIGURE 3, and the other set is symmetrically located (not shown) adjacent the juncture of bars 12 and 15, so that they are in lateral balance.

Beam 11 is connected to a scale dial or like indicator by the knife edge assembly 24 on control bar 14, suspended cradle 25 and linkage 26. Any suitable conventional mechanism connects linkage 26 to actuate conventional scale pointer moving mechanism, and FIGURE 1 shows a diagrammatic connection of linkage 26 to the rotatable pointer P a scale S marked in the range of 0–20 pounds.

At the forward end of beam 11, outer arms 13 and 15 carry laterally aligned conventional knife edge assemblies 27 which rockably support V-grooved cradles 28 having depending generally vertical studs 29 upstanding rigidly from a transverse drop weight support plate 31 which is shown in detail apart from the other mechanism in FIGURES 6–8.

Studs 29 are laterally symmetrically disposed with respect to the longitudinal centerline of main beam 11, and similarly laterally symmetrically disposed are depending webs 32 to which are attached load bearing hangers 33, as by bolts 34. It will be noted that the bolt holes 35 (FIGURES 6, 7 and 8) are centered with the vertical plane containing the axes of studs 29 and the knife edges 27.

Referring to FIGURES 3, 6 and 7 it will be noted that plate 31 is formed with a plurality of, here three, sets of apertures 36, 37 and 38. Each set comprises two apertures aligned on parallel axes. The middle set 37 (FIGURE 3) is substantially aligned with bar 14, and sets 36 and 38 are equidistantly laterally spaced therefrom. The purpose of these apertures is to receive pilot pins depending from the range weights as will appear.

Figure 2:
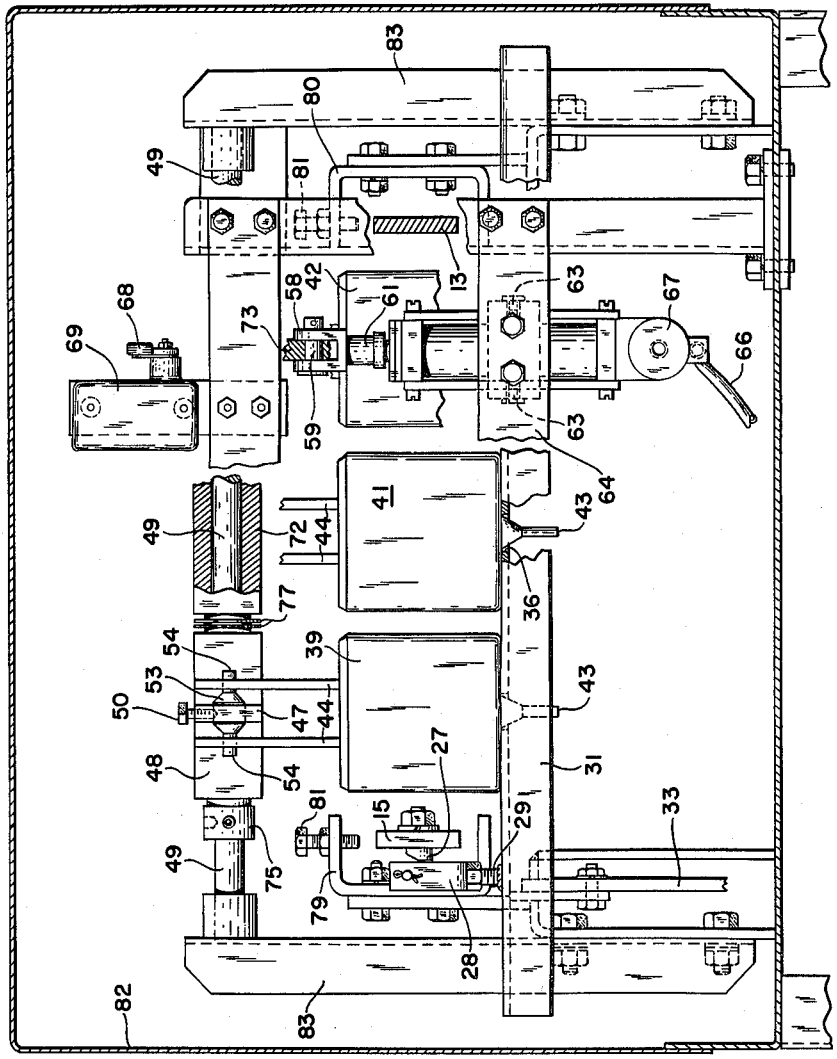
FIGURE 2 is an elevation of the apparatus of FIGURE 1 showing further detail.

In this embodiment there are three range weights 39, 41 and 42 (FIGURE 2). Range weight 39 is a lead filled container of desired weight provided with rigid depending guide pins 43 that are adapted to pilot within support plate openings when weight 39 is lowered onto the support plate. This dual pin and aperture arrangement properly locates weight 39 on the support plate.

The sum of the weights of these range weights is effectively equal to the total weight of counterweights 21.

Upstanding from weight 39 are spaced rigid parallel arms 44 formed with opposed openings 45 having centrally located rounded upper sockets 46 that also are centered in the vertical plane containing knife edge 27, studs 29 and the load hangers 33.

A weight lifting lever 47 has a hub 48 by which it is journaled on a fixed pivot arbor 49 that extends transversely between frame elements. As shown in FIGURE 5, hub 48 is lined with bearing sleeves 52 for surrounding the arbor 49 and providing low friction turning on the arbor.

Intermediate its ends lever 47 has fixed thereto as by set screw 50 a weight hanging pin 53 of hardened steel with oppositely projecting trunnions 54 extending into weight arm apertures 45, and when the weight 39 rests on plate 31 as in FIGURE 1 the trunnions 54 are free of contact with arms 44. As shown in FIGURES 4, 5 and 9 the pin 53 is mounted in a bore 55 intersected by a threaded set screw bore 56, and pin 53 is indented at 57 to receive the end of the set screw and properly center pin 53.

At its outer end lever 47 is pivotally connected, as by a clevis 58 and pivot pin 59 to the upper end of a vertically extensible piston rod 61 of a power cylinder assembly 62 that is adapted to rock lever 47 about arbor 49 between the full and dot-dash line positions shown in FIGURE 1 wherein the weight 39 is respectively seated upon or lifted free of the main beam. In the full line position of FIGURE 1 the piston rod 61 is fully retracted, pin trunnions 54 are free in apertures 45 and weight 39 rests by gravity upon support plate 31.

Power cylinder 62 is an air or hydraulic cylinder of more or less conventional structure internally and it is rockably mounted intermediate its ends on fixed horizontal pivots 63 carried by a bracket 64 that is bolted as at 65 to the frame. The pivot mount for cylinder 62 permits rocking to prevent binding of pivot 59 as arm 47 is rocked about arbor 49.

At the lower end of cylinder 62 a conduit 66 supplies fluid under pressure from a suitable source, and a valve 67 controls the admission of fluid into the cylinder. Normally the piston rod 61 is in the retracted position of FIGURE 1 with the piston urged downwardly as by a spring (not shown).

When valve 67 is actuated to admit fluid under pressure into the cylinder 62, piston rod 61 is extended upwardly to rock lever 47 into the dot-dash line position of FIGURE 1 wherein pin trunnions 54 have engaged in sockets 46 and lifted weight 39 entirely clear of plate 31.

In the upwardly rocked position of lever 47 it engages and trips the spring biased follower arm 68 of a snap switch 69 on the frame. Switch 69 is connected to an indicator that signals the two positions of lever 47.

Similarly a lever 71 is pivoted by hub 72 on arbor 49, and is arranged to lift and release weight 41 with respect to support plate 31 similarly to the way lever 47 is associated with weight 39, and the outer end of lever 71 is pivotally connected to a hydraulic motor 62 like lever 47. The third lever 73 is pivoted by hub 74 on arbor 49 and is similarly arranged to lift and release weight 42 through a hydraulic motor 62. Each of levers 71 and 73 actuates an indicator switch like that at 69.

Thus each of weights 39, 41 and 42 may be individually or in any combination lifted free of the main beam or disposed to rest on the main beam, by selective actuation of the independent fluid pressure motors 62. Similar parts in the connection of the levers to the weights and the motors are otherwise indicated by similar reference numerals.

Lever hubs 48, 72 and 74 are axially located on arbor 49 by end collars 75 and 76 pinned to the arbor, and shimmed fixed collars 77 between the hubs.

Stop means is provided for limiting rocking of the main beam 11 in both directions. This consists of identical U-shaped brackets 79 and 80 fixed to the frame with upper and lower arms extending over bars 15 and 13 respectively. Set screws 81 are adjustably mounted in the upper arms of these brackets to limit upward rocking of the main beam, and the lower bracket arm limits downward locking in each case.

All of the above parts are mounted on a rigid frame mainly enclosed by housing 82 of FIGURE 1. The upright frame members 83 mount the cross arbor 49 and rigid braces such as 84 extend in the direction of the main beam.

*Operation*

Assume in this embodiment that the apparatus is to be operated in weight ranges of 0–20 pounds, 20–40 pounds, 40–60 pounds and 60–80 pounds. A total fixed value counterweight of 60 pounds is secured to the main beam at 21. Each of weights 39, 41 and 42 is 20 pounds.

Suppose that 20 pounds of the first ingredient is to be added to the hopper suspended on hangers 33. All three weights 39, 41 and 42 are now lowered to rest position on support plate 31 by manipulation of the air cylinders 62 to rock levers 47, 71 and 73 downwardly. Thus initially there is a force of 60 pounds acting on the main beam at opposite sides of the fulcrum. Material is poured into the hopper, and immediately pointer P starts to move over scale S. When the full 20 pounds has been added to the hopper the scale will read 20 pounds. At all times during this phase of operation, the weight beam is loaded with 60 pounds on the counterweight side and with 60–80 pounds on the load applying side.

Now suppose that 20 pounds of the second ingredient is to be added into the hopper. One of the weights, say weight 42, is first removed from the plate 31 by selectively actuating associated air cylinder 62 to rock lever 73 upwardly. As lever 73 moves upwardly to a position corresponding to that in dot-dash lines at FIGURE 1, its pin 53 picks up weight 42 and displaces it upwardly to a point where weight 42 including its pilot pins 43 is entirely clear of plate 31 and the main beam. Now the total weight on the loading side is 60 pounds. This repositions the main beam to equilibrium, and also moves pointer P back to zero on the scale S. In effect this substitutes the 20 pound load in the hopper for the removed range weight. The second ingredient is now poured into the hopper and now the pointer again moves over the scale. When the full 20 pounds of the second ingredient has been added into the hopper the scale will again read twenty pounds. At all times during this phase of the operation, the weigh beam is loaded with 60 pounds on the counterweight side and with 60–80 pounds on the loading side, and in the final weight indicating condition the main beam is strained exactly as at the end of introduction of the first ingredient.

Similarly for adding twenty pounds of a third ingredient to the hopper the same procedures will be effected. Weight 41 will be first removed from the plate 31 to establish equilibrium, and the third ingredient poured into the hopper. For adding up to twenty pounds of a fourth ingredient to the hopper the same procedure will take place. This time the last weight 39 will be first lifted from plate 31, so that no weights rest on the main beam during this phase of operation in the 60–80 pound weight range. In each instance accumulated load weight is substituted for the removed range weight.

From the foregoing it will be apparent that in the apparatus of the invention all of the weighing operations, regardless of range, will take place with essentially the same load conditions effective on the main beam. That is there will always be a fixed 60 pound load on the counterweight side, and there will always be between 60 and 80 pounds on the loading side. In the sequence above given the strain conditions effective on the weigh beam will be exactly the same at the time of each measurement. This means that the absolute bending stresses effective upon the main beam and the absolute strains effective on associated mechanism such as the knife edge assemblies and motion transmitting linkages will remain at least within the same narrow limits regardless of the scale range. The result of this is to greatly improve the accuracy and reliability of the weighing apparatus, because at the times of measurement the beam is always similarly strained.

The invention is also similarly applicable to drop weight weighing apparatus not incorporated in batch weighers. In the disclosed embodiment, the particular scale range is selected by removal of the proper weights, and when the hopper contains enough material to cause pointer movement in any range the weigh beam is totally strained similarly to any other range. For example, should 55 pounds of material be desired in the hopper on hangers 33, only one of the weights 39, 41, 42 will be rested on plate 31. Up until the time the first 40 pounds are poured into the hopper scale pointer P will not move, but then further material will cause movement of pointer P until 15 pounds registers on the scale dial, giving a total of 55 pounds. The beam is strained here exactly the same amount that it would be if only 15 pounds was in the hopper, there being three weights 39, 41 and 42 on the plate 31.

In the foregoing the switches 69 usually operate signals such as lighted signs instructing addition of the required weight to the actual scale reading, and/or if desired the different scale ranges may be coextensively printed on the same scale dial chart.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a multi-range weighing apparatus having an indicator provided with a scale and an indicating element movable over said scale, a pivoted beam structure operatively connected to said indicating element, a plurality of range weights adapted to be mounted on said beam on the loading side, each of said weights being sized to correspond to a multiple of said scale extent, means for selectively mounting upon or removing from said beam any one or more of said range weights, and a counterweight of constant value on said beam structure, said weights and counterweight being so related to the scale and various weight ranges that substantially the same condition of total strain effective on the beam structure is maintained regardless of the selected range measured on the scale.

2. In a multi-range weighing apparatus having a scale of predetermined extent provided with a pointer, a pivoted main beam structure operably connected to said pointer, means for converting said apparatus to measure loads on said beam in weight ranges that are at least multiples of said scale extent comprising a counterweight of constant value fixed on said beam and a plurality of weights adapted to be carried by said beam on the loading side opposite said counterweight, each of said weights being sized to correspond to a multiple of said scale extent, and means for selectively maintaining any one or more of said weights free of said beam.

3. In the weighing apparatus defined in claim 2, said counterweight being effectively equal to the sum of said range weights.

4. In a multi-range weighing apparatus wherein a main beam structure is pivoted about a fulcrum with a constant counterweight on the beam structure on one side of the fulcrum and a plurality of removable range weights on the beam structure at the other side of the fulcrum, the total weight of the counterweight being effectively equal to the sum of the range weights, and means for selectively removing any of said range weights from said beam structure.

5. In the weighing apparatus defined in claim 4, a scale having a region of predetermined extent, and each of said range weights corresponding to a multiple of said scale extent.

6. In the weighing apparatus defined in claim 4 each of said range weights corresponding to the weight range of a multiple of a measuring scale extent associated with said beam structure, and signal means for indicating the position of each said weight and hence the range of weight being measured.

7. Weighing apparatus having cooperating relatively movable scale and indicator members and comprising a main beam pivoted on a fulcrum, means operatively connecting said beam to one of said members, a counterweight fixed on said beam at one side of the fulcrum, load applying and range weight support means on the other side of said beam, a plurality of independent range weights, each of said weights being sized to correspond to a multiple of a predetermined extent of said scale, and means for selectively shifting each said weight between a position on said support means and a position where it is maintained to be ineffective upon said beam.

8. In the weighing apparatus defined in claim 7, said range weight shifting means comprising a separate pivoted lift lever operatively associated with each weight.

9. In the weighing apparatus defined in claim 8, a power cylinder operably connected to each said lever for raising or lowering the range weights relative to said beam support.

10. In the weighing apparatus defined in claim 9, each said power cylinder being pivotally mounted and having a piston rod pivotally connected to one of said levers.

11. Weighing apparatus having cooperating relatively movable scale and indicator members and comprising a pivoted main beam rockable about a fulcrum, means operatively connecting said beam to one of said members, a counterweight mounted on the beam at one side of the fulcrum, a range weight support pivotally suspended from the beam at the other side of said support, a plurality of separate range weights, each of which is sized to correspond to a multiple of a predetermined extent of said scale, a load hanger carried by said support, and means for selectively placing upon and removing from said support any of said plurality of weights.

12. In the weighing apparatus defined in claim 11, said support and said weights having cooperating sets of guide means for locating the weights placed on said support.

13. In the weighing apparatus defined in claim 11, said last means comprising pivoted levers individual to the respective weights and having lost motion suspension connections with said weights.

14. In a multi-range weighing apparatus comprising a main weigh beam structure operably connected to an indicator having a scale range of predetermined extent, a counterweight and a plurality of removable range weights adapted to be mounted in counterbalancing relation on said beam structure for measuring on said scale a load applied to said beam structure within the range of said scale, and means for removing one or more of said range weights from said beam structure to permit an accumulation of said load to be substituted therefor in said counterbalancing relation whereby further indication of said load is possible on said scale, each of said weights corresponding to said predetermined scale range.

15. In a multi-range weighing apparatus having cooperating relatively movable scale and indicator members, a pivoted beam operatively connected to one of said members, means for converting said apparatus for measuring loads on said beam that are at least multiples of a predetermined extent of said scale comprising a counterweight of constant value mounted on said beam and a plurality of range weights adapted to be carried by said beam on the loading side opposite said counterweight, each of said range weights being sized to correspond to a multiple of said scale extent, and means for maintaining any one or more of said weights free of said beam.

16. In the weighing apparatus defined in claim 15, said counterweight being effectively equal to the sum of said range weights.

17. In the weighing apparatus defined in claim 15, a support pivotally suspended from said beam for mounting said range weights on said beam, and means for selectively removing each said range weight from the beam comprising a power operated lift lever rockable about a fixed pivot and having a lost motion connection with said range weight.

18. In the weighing apparatus defined in claim 15, said scale member being a stationary dial scale and said indicator member being a rotatable pointer movable over the dial.

References Cited by the Examiner
UNITED STATES PATENTS

| 3,004,618 | 10/1961 | Meier | 177—248 |
| 3,027,956 | 4/1962 | Hibscher | 177—252 |
| 3,055,444 | 9/1962 | Chyo | 177—191 |

FOREIGN PATENTS 200,356   10/1958   Austria.

LEYLAND M. MARTIN, *Primary Examiner.*

LEO SMILOW, *Examiner.*